(12) United States Patent
McGarvey et al.

(10) Patent No.: US 11,745,224 B2
(45) Date of Patent: *Sep. 5, 2023

(54) METHOD AND APPARATUS FOR SORTING (71) Applicant: KEY TECHNOLOGY, INC., Walla Walla, WA (US)

(72) Inventors: Kenneth J. McGarvey, Walla Walla, WA (US); Gerald R. Richert, Walla Walla, WA (US); Elliot T. Burch, Walla Walla, WA (US); Bret J. Larreau, Eagle, ID (US)

(73) Assignee: Key Technology, Inc., Walla Walla, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,306

(22) Filed: Sep. 15, 2022

(65) Prior Publication Data

US 2023/0015809 A1    Jan. 19, 2023

Related U.S. Application Data

(63) Continuation of application No. 16/670,179, filed on Oct. 31, 2019, now Pat. No. 11,446,707, which is a
(Continued)

(51) Int. Cl.
*B07C 5/342* (2006.01)
*B07C 5/36* (2006.01)
*G06V 10/24* (2022.01)
*G06V 10/20* (2022.01)
*G06V 20/52* (2022.01)
*G06F 18/25* (2023.01)
(Continued)

(52) U.S. Cl.
CPC ............ *B07C 5/3422* (2013.01); *B07C 5/366* (2013.01); *G06F 18/251* (2023.01); *G06V 10/245* (2022.01); *G06V 10/25* (2022.01); *G06V 10/255* (2022.01); *G06V 20/52* (2022.01); *B07C 2501/0018* (2013.01); *B07C 2501/0081* (2013.01); *G06T 2207/30128* (2013.01); *G06V 20/68* (2022.01)

(58) Field of Classification Search
None
See application file for complete search history.

(56) References Cited

U.S. PATENT DOCUMENTS 5,526,437 A    6/1996 West
7,339,660 B1   3/2008 Cohn et al.
(Continued)

OTHER PUBLICATIONS

L. Smeesters, Internal scattering as an optical screening method to identify peeled potatoes giving rise to an excess of acrylamide, Journal of Food Engineering, Mar. 10, 2016, pp. 255-261, vol. 195, Elsevier, Brussel, Belgium.
(Continued)

*Primary Examiner* — Jiangeng Sun
(74) *Attorney, Agent, or Firm* — Randall Danskin P.S.

(57) ABSTRACT

An apparatus for sorting is described and includes acquiring a multiplicity of synchronized image signals of a product stream which is to be sorted; generating a multiplicity of fused sensor signals; forming an image model previously acquired from the objects to be sorted; identifying objects in the product stream, and generating object presence and defect signals; determining a spatial orientation of the objects in the product stream; detecting the defects and removing the defects from the product stream.

26 Claims, 2 Drawing Sheets

Related U.S. Application Data continuation of application No. PCT/US2018/014362, filed on Jan. 19, 2018, and a continuation of application No. 15/634,694, filed on Jun. 27, 2017, now Pat. No. 10,478,863.

(51) Int. Cl.
  *G06V 10/25* (2022.01)
  *G06V 20/68* (2022.01)

(56) References Cited

U.S. PATENT DOCUMENTS

| | | |
|---|---|---|
| 8,406,919 B1 | 3/2013 | Hill |
| 9,035,210 B1 | 5/2015 | Davis |
| 9,266,148 B2 | 2/2016 | Adams et al. |
| 2002/0118892 A1 | 8/2002 | Nguyen |
| 2011/0050880 A1 | 3/2011 | Bourg, Jr. |
| 2012/0037545 A1 | 2/2012 | Van Kasteren |
| 2012/0188363 A1 | 7/2012 | Hamid |
| 2014/0056482 A1 | 2/2014 | Burgstaller |
| 2014/0269815 A1 | 9/2014 | Sloat |
| 2015/0375269 A1 | 12/2015 | Adams |
| 2016/0158806 A1 | 6/2016 | Bourely |

OTHER PUBLICATIONS

Notification of Transmittal of the International Search Report and the Written Opinion of the International Searching Authority, or the Declaration, PCT/US18/014362, dated Mar. 20, 2018.

Vittorio Vivanti, Enrico Finotti, and Mendel Friedman, Level of Acrylamide Precursors Asparagine, Fructose, Glucose, and Sucrose in potatoes Sold at Retail in Italy and in the United States, Journal of Food Science, Feb. 22, 2006, C81-C85, vol. 71 Nr. 2.

METHOD AND APPARATUS FOR SORTING

RELATED APPLICATIONS

This application is a Continuation Application of co-pending U.S. patent application Ser. No. 16/670,179, filed Oct. 31, 2019, entitled "A Method and Apparatus for Sorting," for which a Notice of Allowance (NOA) has been issued by the USPTO and which is fully and completely incorporated herein by reference. Co-pending U.S. patent application Ser. No. 16/670,179, filed Oct. 31, 2019 is a Continuation Application of U.S. patent application Ser. No. 15/634,694, filed Jun. 27, 2017, entitled "A Method and Apparatus for Sorting," which has been issued by the USPTO as U.S. Pat. No. 10,478,863 and which is fully and completely incorporated herein by reference. This Continuation Patent Application also claims priority to earlier filed PCT/US2018/014362, having the same title, filed on 19 Jan. 2019 and which is fully and completely incorporated herein by reference.

The inventorship of this Continuation Patent Application is the same as the inventorship of co-pending U.S. patent application Ser. No. 16/670,179 and of U.S. patent application Ser. No. 15/634,694 and of PCT/US2018/014362 to which this Continuation Application claims priority.

TECHNICAL FIELD

The present invention relates to a method and apparatus for sorting, and more specifically to a method for determining a defect in an agricultural product which typically cannot be visually discerned, and then removing the product having the agricultural defect or the defect itself, from a moving product stream.

BACKGROUND OF THE INVENTION

The developers of optical sorting systems which are uniquely adapted for visually inspecting a mass-flow of a given food product have endeavored, through the years, to provide increasing levels of information which are useful in making well-informed sorting decisions to effect sorting operations in mass-flow food sorting devices. While the capturing and processing of product images employing prior art cameras and other optical devices has long been known, it has also been recognized that images of a product formed by visible spectrum electromagnetic radiation typically will not provide enough information for an automated sorting machine to accurately identify all (and especially hidden) food or other agricultural defects, and which may subsequently be later identified after further processing of the product. For example, one of the defects in agricultural products which have troubled food processors through the years has been the effective identification of "sugar end" defects in potato products, and more specifically potato products that are destined for processing into food items such as French fries and the like.

"Sugar ends" and which are also referred to as "dark ends", "glassy ends", "translucent ends" and "jelly ends" is a physiological, tuber disorder, which is caused by environmental conditions which occur during the growth of the potato plant. Potato strips or fries made from "sugar end" potatoes exhibit or display undesirable dark-brown areas on the product after it has been subjected to frying. This defect is typically caused by the higher concentration of reducing sugars found in the given darkened region of the potato. The process of frying the product results in caramelizing, which creates the undesirable dark brown region on the fried product. Heretofore, the challenge with food processors has been that the "sugar end" defects are typically invisible to traditional optical detection technology until after the potato product has been thoroughly fried. In view of this situation, potato strip processors can be unaware they have "sugar end" problems with a given lot of potatoes they are processing until their downstream food service customers fry the potato strips and then provide complaints. "Sugar ends" are usually associated with tubers that have a harvested shape which are somewhat pointed on the stem end of the potato. However, tubers having what is considered to be an ideal shape may also develop this anomaly.

Those skilled in the art have recognized that cultural, or management practices that increase a potato plant's susceptibility to heat or moisture stress during tuber initiation, and bulking, can encourage "sugar end" development. As should be understood, tubers are particularly sensitive to environmental stress during the early bulking phase. It has been found that sugars can develop in tubers weeks or even months after environmental stress occurs.

Prior art attempts have been made to provide a means for detecting "sugar ends" in an optical sorting device. An example of one of these devices is seen in U.S. Patent Publication No. U.S. 2014/0056482A1 to Burgstaller et al. and which discloses a sensor unit in a machine for detecting "sugar end" defects of potatoes, and which includes a methodology which has the steps of irradiating potatoes with at least one light source and collecting a reflected light; and then applying at least one classification feature to the light measurement signals taken from the reflected light. In the methodology as described in that published application, the at least one classification feature corresponds to a predefined "sugar end" criterion. Once the respective potato being sorted is classified as having a "sugar end" defect it is, thereafter, removed from further processing. It should be understood that the means employed in this published application for the determination or detection of a classification feature comprises, at least in one form of the invention, calculating a deference curve for individual locus points by calculating the differences between the spectral light measurement signals of the respective locus points, and the spectral values of a referenced spectrum for a number of wavelengths; or by calculating the differences between the nth derivative of the spectral light measurement signals of the respective locus points, and the nth derivative of the reference spectrum for a number of wavelengths.

While this methodology, as discussed in the above-referenced published patent application has achieved some degree of success, the implementation of the methodology has proved, in some instances, to be difficult or cumbersome. Consequently, the amount of potato products which can be processed utilizing this same technology appears to be somewhat limited in view of the complexity of the methodology as more specifically outlined in that reference. The teachings of U.S. Patent Publication No. U.S. 2014/0056482A1 is incorporated by reference herein.

The present invention, as described hereinafter, avoids the detriments associated with the prior art practices, and provides a new method of sorting which allows food processors an improved means for detecting, and then removing agricultural products having defects in a manner not possible, heretofore.

SUMMARY OF THE INVENTION

A first aspect of the present invention relates to a method of sorting which includes acquiring a multiplicity of synchronized image signals from a plurality of image generating devices; generating a multiplicity of fused sensor signals by combining the multiplicity of synchronized image signals of the image generating devices; forming an image model comprising image signals previously acquired from objects of interest and defects; applying the image model to the multiplicity of fused sensor signals, and forming a resulting object presence and defect signals; identifying individual objects of interest with the respective object presence and defect image signals; determining a spatial orientation and location of the objects of interest in each of the object presence and defect image signals; detecting defects within the object presence and defect image signals by comparing defect aspects relative to object aspects, to object images formed of the object presence and defect image signal; and removing the unacceptable agricultural products having defects from the product stream.

Another aspect of the present invention relates to a method of sorting which includes acquiring a multiplicity of synchronized image signals, each having discreet signal features, from a plurality of image generating devices, and wherein the synchronized image signals represent individual agricultural products traveling in a product stream, and which have characteristics, and aspects, which are deemed acceptable for further processing, and characteristics, and aspects, which are deemed unacceptable, for further processing; generating a multiplicity of fused sensor signals by combining the multiplicity of synchronized image signals by a selective synchronization of the image generating devices, and by utilizing a known position, orientation, and an operational response of the respective image generating devices so as to allow the generation of an accurate spatial resolution of each of the agricultural products travelling in the product stream, and to further align the signal features of each of the image signals; predicting the presence of the acceptable, and unacceptable agricultural products in the fused sensor signals by applying an image model previously formed from a multiplicity of image signals acquired from acceptable and unacceptable agricultural products, to the multiplicity of fused sensor signals, so as to facilitate the formation of a resulting acceptable agricultural product image signal; and an unacceptable agricultural product image signal; identifying individual agricultural products travelling in the product stream as being an acceptable, or an unacceptable agricultural product, by identifying one or more of a group of pixels in each of the acceptable and unacceptable agricultural product image signals; determining a spatial orientation of the identified individual agricultural products travelling in the product stream by applying a prior source of knowledge of acceptable and unacceptable agricultural product aspects, characteristics and agricultural object images, to the acceptable and unacceptable agricultural product image signals; detecting unacceptable agricultural products by applying a prior source of knowledge of unacceptable agricultural product aspects and object images to the acceptable and unacceptable agricultural product image signals; identifying the location of the unacceptable agricultural products in the acceptable and unacceptable product image signals; and removing the unacceptable agricultural products from the product stream.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
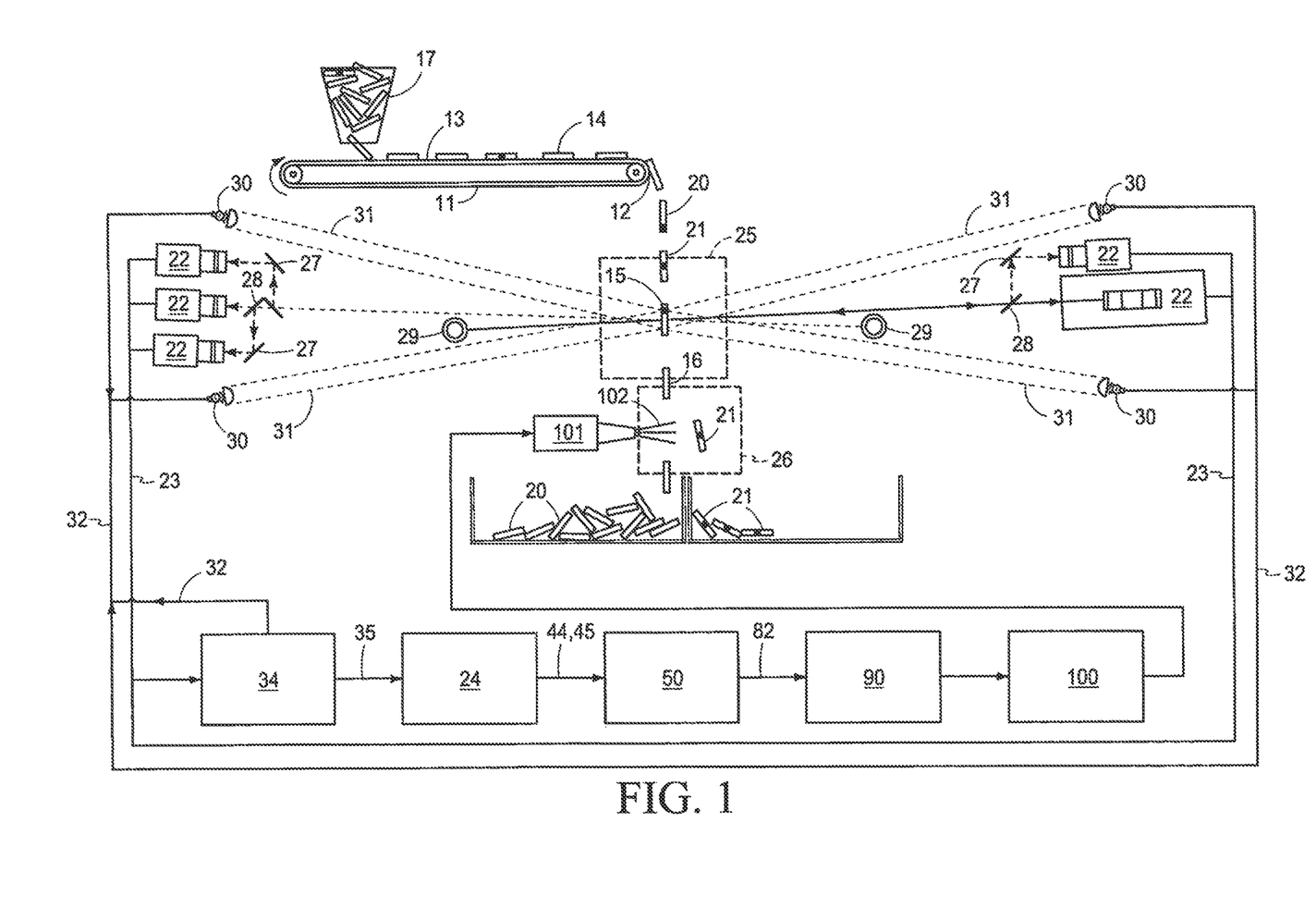
FIG. 1 is a greatly simplified, schematic view of an apparatus which may be utilized to practice the present methodology.
Figure 2:
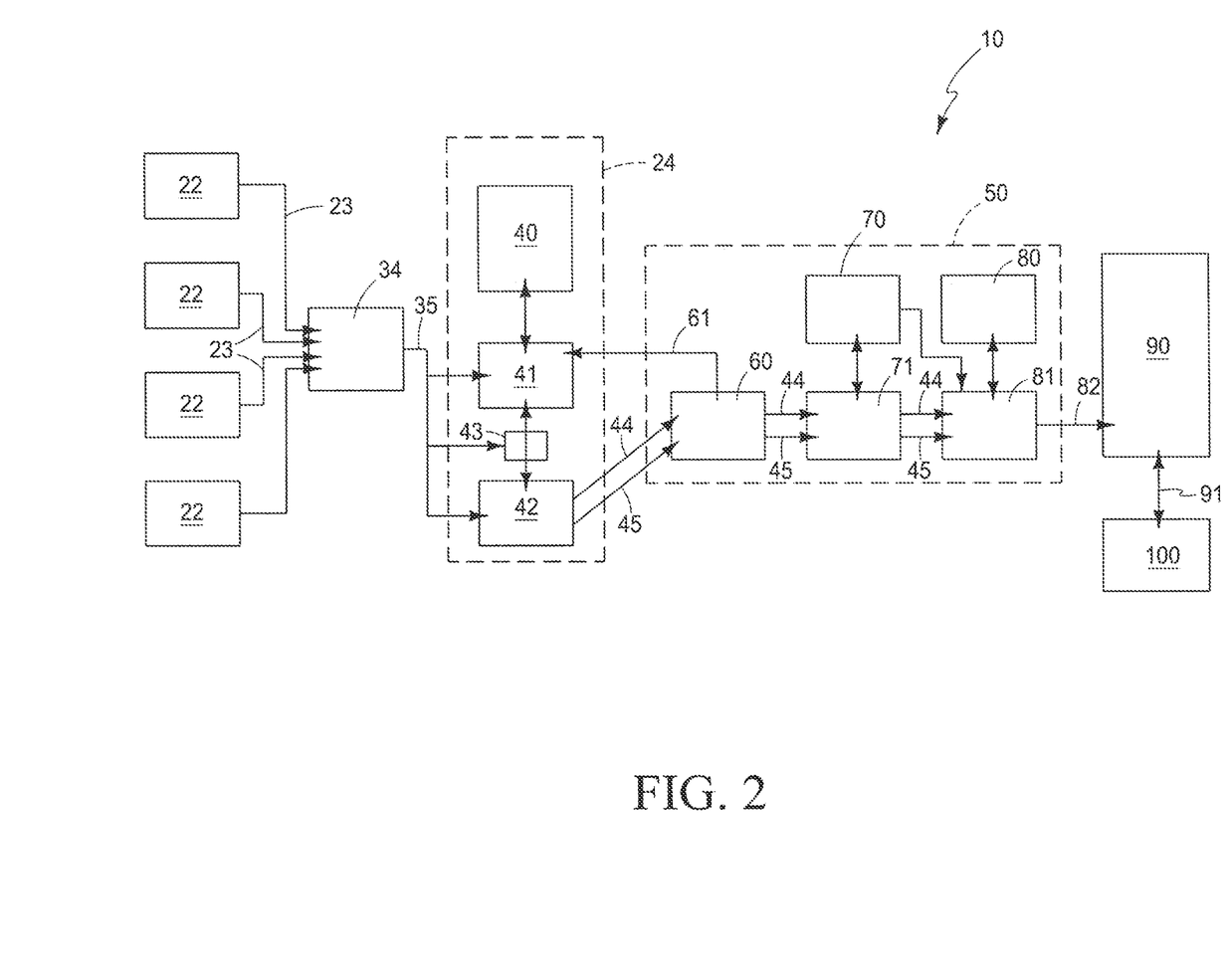
FIG. 2 is a greatly simplified, schematic view of the methodology of the present invention.

The present methodology of the invention is generally indicated by the numeral 10, and is best understood by a study of FIGS. 1 and 2, respectively. As best understood by a study of FIG. 1, the method employs, in one form of the invention, a conveying device which is fragmentarily shown in FIG. 1 as a conveying device 11. The conveying device, as illustrated in that drawing, shows a distal, discharge end 12 of a conveyor belt 11, and which further has an upper conveying surface 13 which supports a product stream 14 to be inspected. The product stream 14 is formed of individual objects of interest 15, which are released from the distal, discharge end 12, and allowed to move, under the influence of gravity, in a downwardly directed path of travel which is generally indicated by the numeral 16. A source of the objects of interest or products which is to be inspected, and sorted, is labeled by the numeral 17.

The product stream 14 has objects of interest or products 15 which, in one form of the invention, may include various agricultural products which have both acceptable features for further processing 20, or unacceptable features for processing which are generally indicated by the numeral 21. For example, in the processing of potatoes, unacceptable features 21 of a potato product would be the presence of "sugar ends" or regions of rot, which will be detected by the methodology as described, hereinafter. Positioned downstream of the distal discharge end 12, of the conveying device 11, are a multiplicity of image capturing devices 22 which are generally shown, and which further are positioned laterally outwardly relative to the downwardly directed path of travel 16. The multiplicity of imaging capturing devices 22 (which may include, for example hyperspectral or multispectral cameras of assorted designs) are utilized, in a first step of the present method, and which includes acquiring a multiplicity of synchronized image signals 23 each having discreet signal features, from a plurality of image generating devices 22. The multiplicity of image capturing devices 22 produce a multiplicity of synchronized image signals 23 which are then selectively supplied to a first controller, and which is further generally indicated by the numeral 24. The synchronized image signals 23 represent individual objects of interest 15 such as agricultural products which are traveling in the product stream 14, and which have characteristics and aspects which are deemed acceptable 20, for further processing, and characteristics and aspects which are deemed a defect, or unacceptable 21 for further processing. The downwardly directed path of travel 16 of the product stream 14 passes through a downstream inspection station which is generally indicated by the numeral 25, and a downstream defect removal station 26, and which is further located elevationally, below the inspection station 25. The multiplicity of image capturing devices 22 are positioned so as to acquire image signals 23 from the objects of interest 15 while they pass through the inspection station 25 in a manner well understood in the art. Assorted optical reflectors 27, and optical combiners 28, are provided, and which co-align multiple image capturing devices 22. Further, well known background elements are provided, and which additionally are positioned laterally, outwardly relative to the product stream 14, and which is passing through the inspection station 25.

As best seen by reference to FIG. 1, the methodology of the present invention includes a step of generating a source of synchronized electromagnetic radiation 31 which is directed towards, and reflected at least in part from, the product stream 14, and which further is formed of the individual objects of interest 15 passing through the inspection station 25. As seen in FIG. 1, an electromagnetic radiation emitter 30 is generally illustrated, and which is positioned laterally, outwardly relative to the inspection station 25. When selectively energized, the electromagnetic radiation emitter 30 emits a source of electromagnetic radiation 31 which is directed towards, and reflected at least in part by the individual objects of interest 15 passing through the inspection station 25. This emitter of electromagnetic radiation may produce various wavelengths of electromagnetic radiation which enhances the ability of the respective image capturing devices 22 to capture individually unique images of the objects of interest 15 which allow for the identification of assorted characteristics and aspects of each object of interest, and in particular, various defects in the product stream 14. For example, the defects could include "sugar ends" or regions of rot which are present in a potato products undergoing the inspection and sorting. As also seen in FIG. 1, an electromagnetic radiation emitter control signal 32 is provided to each electromagnetic radiation emitter 30. This control signal 32 causes the selective energizing of each of the emitters 30. The selective energizing of the individual electromagnetic radiation emitters 30 to achieve the aforementioned benefits of this invention, is explained in significant detail in U.S. Pat. No. 9,266,148, the teachings of which are incorporated by reference herein. The method 10 of the present invention includes still another step of generating a multiplicity of fused image and sensor signals 34 by combining the multiplicity of synchronized image and sensor signals 23 by a selective synchronization of the image and sensor generating devices 22 and the respective electromagnetic radiation emitters 30, and by utilizing a known position, orientation and an operational response of the respective image and sensor generating devices 22, so as to allow the generation of an accurate spatial resolution of each of the objects of interest 15 which are traveling in the product stream 14, and to further align the signal features of each of the image and sensor signals. As seen in FIG. 1, the control signal 32 is operably controlled by the selective synchronization step 34. The selective synchronization 34 of the image and sensor signals and the energizing of the electromagnetic radiation emitters 30, is performed in a manner so as to inhibit the destructive interference that may occur when the electromagnetic radiation emitters 30, and sensors 22 are simultaneously rendered operable. In the methodology 10 of the present invention, the synchronized image and sensor signals 23 are formed by a methodology which includes the step of selecting image signals 23 from multiple, different sensors 22. Still further in the methodology 10 of the present invention the aligning of the signal features of each of the synchronized image and sensor signals so as to form, at least in part, the multiplicity of fused sensor signals 35 comprises the step of conducting a spatial registration of the sensor signals 23 with each other, and with an ejector controller 100, and which will be discussed in greater detail, below. The high aspect spatially fused sensor signals 35 are then supplied to the first controller 24 as seen in FIG. 2.

The high aspect spatially fused sensor and image signals 35 are provided to the controller 24, and to individual modules within the controller 24, (FIG. 2) and which perform many of the methodology steps of the present invention. In this regard, the first controller 24 has a module 40 which contains prior knowledge of object defects which have been acquired from the previous inspection of similar objects of interest. This prior knowledge of the object defects 40 is provided to another module 41, and which conducts supervised training of the first controller 24, so as to allow the present methodology to teach itself how to improve the sorting reliability of the present invention 10. The supervised training module 41 is supplied with a portion of the high aspect, spatially fused sensor and image signals 35, and which has been acquired from the multiple image capturing devices 22. Still further the first controller 24 includes a prediction module 42 which predicts the presence of the objects of interest 15, and possible defects in the fused sensor signals 35 by applying an image model 43, which was previously formed from a multiplicity of image and sensor signals which were acquired from the objects of interest 15, and the defects, to the multiplicity of fused sensor signals 35, so as to facilitate the formation of a resulting object presence image signal 44, and defect image signal 45, respectively. The present methodology 10 includes a second controller 50.

The second controller 50 is operably coupled with the first controller 24. Still further the second controller has a module 60 which implements a step in the methodology 10 which includes identifying the individual objects of interest 15 with the object presence signals 44, and defective image signals 45, by identifying one, or more of a group of pixels in each of the object presence and defect image signals. Still further, the second controller 50, and more specifically the module for identifying objects of interest 60, is operable to supply a signal 61 to the module for supervised training 41, so as to allow the module for supervised training 41 to continue to learn as the inspection process proceeds so as to increase the accuracy and sorting efficiency of the presently disclosed methodology 10. The object presence and defect signals 44 and 45 are supplied to other modules in the second controller 50. More specifically, the second controller 50 has a module for implementing a step which includes storing and supplying a source of knowledge of the object aspects for use in the sorting process. This module 70 supplies the stored information to another module 71, and which implements a step in the methodology 10 of determining a spatial orientation of the objects of interest 15 traveling in the product stream 14 by applying the prior source of knowledge of the object aspects 70, to a multiplicity of object images which are formed of the object presence and defect image signals 44 and 45, respectively. Still further the second controller 50 includes a module which provides a prior source of knowledge of defect aspects 80, relative to object aspects. In this regard this prior knowledge 80 is provided to a module 81 for detecting defects within the unacceptable objects of interest 15 by applying the prior source of knowledge 80 to object aspects 70, and to the object images formed of the object presence and defect signals 44 and 45, respectively. The module for detecting defects 81, and the object presence, and defect signals 44 and 45, generates a defect signal which is generally indicated by the numeral 82, and which further is itself supplied to an object removal control 90. The object removal control 90 generates a signal 91 which is provided to an ejector controller, which further is generally indicated by the numeral 100. Therefore, the methodology of the present invention 10 after identifying the location of the unacceptable objects of interest having defects 81, in the object image signals, the methodology 10 includes a step of removing the unacceptable objects of interest having defects from the product stream by means of the ejector controller 100. The ejector controller operably controls an air manifold 101, (FIG. 1) of conventional design, and which is further configured to release a pressurized blast of ambient air 102, which is operable to remove defective objects of interest 21 from the downwardly descending product stream 16, so as to form a product stream having only acceptable objects of interest 15.

Operation

The operation of the described embodiment of the present invention is believed to be readily apparent, and is briefly summarized at this point.

In its broadest aspect the present invention relates to a method of sorting 10 which comprises a first step of acquiring a multiplicity of synchronized image signals 23 of individual objects of interests 15, and defects 21, from a plurality of image generating devices 22. The method includes another step of generating a multiplicity of fused sensor signals 34 by combining the multiplicity of synchronized image signals 23 of the image generating devices 22. Still further the method of sorting 10 of the present invention includes yet another step of forming an image model 43 comprising image signals 23 which were previously acquired from the objects of interest 15, and the defects 20. The method includes yet another step of applying the image model 43, to the multiplicity of fused sensor signals 34, and forming a resulting object presence 44, and defect signals 45, respectively. The method of the present invention 10 includes another step of identifying individual objects of interest 60, with the respective object presence 44, and defect image signals 45. The method of the present invention includes yet another step of determining a spatial orientation and location of the objects of interest 71 in each of the image signals 23. The method includes yet another step of detecting defects 81 within the object presence and defect signals 44 and 45, respectively, by comparing defect aspects 80 relative to object aspects 70, to object images formed of the object presence and defect image signals 44 and 45, respectively. Finally, the present invention in its broadest aspect includes a last step of removing 100 the objects of interest 15 having defects 21 from the product stream 14.

The method 10 of the present invention includes another step, and wherein the synchronized image signals 23 represent individual objects of interest 15 such as agricultural products traveling in a product stream 14, and which have characteristics, and aspects, which are deemed acceptable for further processing 20, and characteristics and aspects which are deemed unacceptable for further processing 21. This is best seen in FIG. 1. The method includes another step, and wherein the synchronized image signals 23 are formed by a selective synchronization 23 of the image generating devices 22, and by utilizing a known position, orientation and an operational response of the respective image generating devices 22 so as to allow the generation of an accurate, spatial resolution of each of the objects of interest 15 traveling in the product stream 14, and to further align the signal features of each of the image signals 23. In the present invention the method includes a further step, and wherein the image models 43 are formed from a methodology which includes previously acquiring 40 a multiplicity of image signals 23 from known acceptable 20, and unacceptable 21 objects of interest 15, such as agricultural products, and the like. In the present methodology 10 the step of identifying individual objects of interest 60 further includes the step of identifying one or more pixel groups in each of the object presence 44, and defect image signals 45 which identify the acceptable objects of interest 20 or defects 21.

In the present invention the methodology 10 includes another step of determining the spatial orientation 71, and location of the respective objects of interest 15 and further comprises another step of developing a prior source of knowledge of object aspects 70, and which is applied to object images which are formed of the object presence and defect signals 44 and 45, respectively. In the present methodology 10, the step of detecting unacceptable agricultural products, or defects in the objects of interest 81, further comprises another step of developing a prior source of knowledge of defect aspects 80, relative to object aspects 70, to a multiplicity of object images formed of the object presence and defect image signals 44 and 45, respectively. In the present methodology 10, and before the step of acquiring the multiplicity of synchronized image signals 23, the method further comprises still another step of providing a product stream 14 of individual objects of interest 15, such as agricultural products having both acceptable agricultural products 20, and unacceptable products 21, and which must be removed from the product stream 14. The method includes another step of passing the product stream 14 having both the acceptable agricultural products 20 and unacceptable agricultural products or objects of interest 21 through an inspection station 25 (FIG. 1). In the present invention, the methodology 10 includes another step of acquiring the multiplicity of synchronized image signals 23, and after the step of providing the product stream 14, generating a source of synchronized electromagnetic radiation 31 which is directed towards and reflected, at least in part, from the product stream 14 of the agricultural products or objects of interest passing through the inspection station 25. In the present invention the method 10 further comprises a step of providing a first controller 24 which predicts the presence of the objects of interest 15 and defects 21 in the fused sensor signals 35, and which further applies the image model 43 to at least some of the multiplicity of fused sensor signals 35. The method further comprises another step of providing a second controller 50, and which identifies individual objects of interest 15, and defects 21, in the object presence and defect image signals 44 and 45; and further determines the spatial orientation 71 of the identified objects of interest 15 and defects 21 traveling in the product stream 14. The method 10 also includes another step of identifying the defects 81, and the defect image signal 82 identifies the location of the defects in the defect image signals. An unacceptable agricultural product image signal is provided to the third controller or object removal control 90. In the present methodology 10, the third controller 90 is controlled, and coupled with, and renders operational an ejector 101. The third controller 90 is coupled in signal receiving relation relative to the unacceptable agricultural product image or defect signal 82 which is generated by the second controller 50, and further renders the ejector 101 operational by means of the ejector controller 100 to remove the unacceptable agricultural product or any defects 21 from the product stream 14, and which is passing by, or through, the defect removal station 26.

More specifically the methodology 10 of the present invention further includes a step of acquiring a multiplicity of synchronized image and sensor signals 23, each having discreet signal features, from a plurality of image generating and sensor devices 22. The synchronized image and sensor signals 23 represent individual objects of interest 15, such as agricultural products, which are traveling in a product stream 14, and which have characteristics and aspects which are deemed acceptable for further processing 20, and characteristics and aspects which are deemed a defect and unacceptable 21 for further processing. The present method includes another step of generating a multiplicity of fused image and sensor signals 34 by combining the multiplicity of synchronized image and sensor signals 23 by a selective synchronization of the image and sensor generating devices 22, and by utilizing a known position, orientation, and an operational response of the respective image and sensor generating devices 22 so as to allow the generation of an accurate spatial resolution 35 of each of the objects of interest 15 traveling in the product stream 14, and to further align the signal features of each of the image and sensor signals 23. The method includes still another step of predicting the presence 42 of the objects of interest 15, and possible defects 21, in the fused image and sensor signals 35 by applying an image model 43 which is previously formed from a multiplicity of image signals 35, and which are further acquired from the objects of interest 15 and defects 21, to the multiplicity of fused sensor signals 35 so as to facilitate the formation of a resulting object presence image signal 44, and a defect image signal 45. The method 10 includes another step of identifying the individual objects of interest 15, with the object presence and defect image signals 44 and 45, by identifying one or more of a group of pixels in each of the object presence and defect image signals 44 and 45, respectively. The method 10 of the present invention further includes another step of determining a spatial orientation 71 of the objects of interest 15 traveling in the product stream 14 by applying a prior source of knowledge 70 of the object aspects to a multiplicity of the object images which are formed of the object presence and defect image signals 44 and 45, respectively. The method includes yet another step of detecting defects 81 within the unacceptable objects of interest 15 by applying a prior source of knowledge 80 of defect aspects relative to object aspects, to the object images formed of the object presence and object defect signals 44 and 45, respectively. The method includes still another step of identifying the location 81 of the unacceptable objects of interest having defects in the object image signals; and yet another step 100 of removing the unacceptable objects of interest 15 having defects from the product stream 14 so as to provide a resulting uniform product stream.

In the methodology of the present invention 10 the discreet signal features of the multiplicity of synchronized image signals 23 are selected from the group comprising signals generated by any one or more of individual hyperspectral or multispectral imagers or scanners 22 which are employed in the apparatus and which are schematically represented in FIG. 1.

Still further the synchronized image signals 23 are formed by a methodology which includes a step of conducting a spatial registration of the respective image signals. In addition to the foregoing, the aspects and characteristics of the objects of interest 15, and which are deemed acceptable for further processing are selected from individual products 15 having a known, and acceptable qualities. Still further, the characteristics of the objects of interest 15 which are deemed unacceptable for further processing are selected from the group comprising individual products 15 having known unacceptable qualities. Moreover, the aligning of the signal features of each of the synchronized image signals 23 so as to form, at least in part, the multiplicity of fused image or sensor signals 35 comprises another step of conducting a spatial registration of the respective sensors 22 with each other, and with the ejector controller 100.

The methodology 10 of the present invention further includes yet other steps which are directed to the formation of the image model 43. In this regard, the image model 43 is formed by a methodology which includes a step of utilizing a standard classification algorithm such as a partial least square algorithm (PLS). In addition to the foregoing, the prior source of knowledge of the object aspects 70, which is supplied to the multiplicity of object images, and which are further used to determine the spatial orientation of the identified objects of interest 71 is formed by a methodology which includes the steps of conducting an object shape analysis; and conducting an object aspect measurement. Moreover, the prior source of knowledge of the defect aspects 80, and which are applied to the multiplicity of object images formed by the present methodology comprises the step of qualifying unacceptable pixel groups found in the image signals with object regions identified in object aspects. Additionally, the step of removing the unacceptable objects of interest 90 from the product stream 14 further comprises the step of removing an unacceptable portion of an object of interest 15, from an acceptable portion of the same object of interest 15.

As should be understood, and in the present methodology 10, and before the step of acquiring the multiplicity of synchronized image signals 23, the method 10 further includes a step of providing a product stream 14 of individual objects of interest 15 which have characteristics and aspects of both acceptable 20, and unacceptable objects of interest 21, and passing the product stream 14 having both the acceptable and unacceptable objects of interest 20 and 21 through an inspection station 25. In addition to the foregoing the methodology further includes, before the step of acquiring the multiplicity of synchronized image signals 23, and after the step of providing the product stream 14, generating a source of synchronized electromagnetic radiation 31 which is directed towards, and reflected at least in part from, the product stream 14 which is formed of the objects of interest 15 passing through the inspection station 25. In addition to the foregoing, the method of the present invention 10 includes yet another step of providing a first controller 24 which predicts the presence of the objects of interest 15, and defects 21 in the fused sensor signals 35, and which further applies the image model 43 to the multiplicity of fused sensor and image signals 35. The method 10 further includes still other steps of providing a second controller 50 which identifies individual objects of interest 15, and defects 21, in the product stream; determines the spatial orientation of the identified individual objects of interest 71 traveling in the product stream 14; detects the objects of interest 15; identifies the location of the defects 21 in the object presence and defect image signals 44 and 45, and further generates a signal 82 which indicates the presence and location of the defect(s) 21 in the product stream 14. The method 10 of the present invention includes yet another step of providing a defect removal station 26, and positioning the defect removal station downstream of the inspection station 25 (FIG. 1). The method includes another step of providing an ejector 101, and positioning the ejector 101 in the defect removal station 26, and which is effective, when made operational, to remove the unacceptable objects of interest 21 from the product stream 14. The method 10 includes yet another step of providing an ejector controller 100 which is controllably coupled with, and renders operational the ejector 101. A third controller 90 is coupled in defect signal 82 receiving relation relative to the second controller 50, and which further renders the ejector controller 100 operational to cause the ejector 101 to remove the unacceptable objects of interest 21 from the product stream 14 (FIG. 1). Therefore it will be seen that the present invention provides a convenient means for detecting unacceptable objects of interest in a product stream, and which may include agricultural products such as potatoes having agricultural defects such as "sugar ends," in a particularly efficient fashion which has not been available in automated sorting devices utilized, heretofore. The present methodology is efficient, operates reliably, and further has an inventive feature which allows it to self-learn so as to increase the efficiency and reliability of the sorting operations of a device employing same.

In compliance with the statute, the invention has been described in language more or less specific as to structural, and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalence.

We claim:

1. An apparatus for sorting comprising:
   a conveying device having a conveying surface, the conveying device being configured such that a product stream of individual objects of interest can be conveyed along the conveying surface, each of the individual objects of interest have features that are invisible to traditional optical detection, said features that are invisible to traditional optical detection are deemed acceptable or unacceptable for further processing;
   an inspection station having a plurality of hyperspectral or multispectral image generating devices, the inspection station positioned relative to the conveying device such that the product stream passes through the inspection station, each of the plurality of hyperspectral or multispectral image generating devices is configured to generate a multiplicity of synchronized image signals of the individual objects of interest, each of the multiplicity of synchronized image signals having discreet signal features, and wherein the multiplicity of synchronized image signals represent the individual objects of interest traveling in the product stream;
   wherein the multiplicity of synchronized image signals are combined by selective synchronization of the hyperspectral or multispectral image generating devices to generate a multiplicity of fused image and sensor signals, and a spatial resolution of each of the individual objects of interest travelling in the product stream is generated by utilizing a known position, orientation, and an operational response of each of the hyperspectral or multispectral image generating devices, and to further align the discrete signal features of each of the multiplicity of synchronized image signals;
   a controller that implements a plurality of control functions, said plurality of control functions includes a first control function to predict the presence of acceptable and unacceptable characteristics in the individual objects of interest in the product stream by applying an image model to the multiplicity of fused image and sensor signals, to facilitate formation of an object presence image signal, and to facilitate formation of a defect image signal, the image model is formed from a multiplicity of previously acquired synchronized image signals from individual objects of interest having acceptable characteristics and aspects, and from individual objects of interest having unacceptable characteristics and aspects that include features that are invisible to traditional optical detection,
   said plurality of control functions includes a second control function to identify individual objects of interest travelling in the product stream as being an acceptable object of interest or as being an unacceptable object of interest, by identifying one or more of a group of pixels in each of the object presence image signals and defect image signals which identify objects of interest or defects;
   wherein a spatial orientation and location of the identified individual objects of interest travelling in the product stream is determined by applying a prior source of knowledge of acceptable individual objects of interest characteristics and aspects and unacceptable individual objects of interest characteristics and aspects, to the object presence image signals and to the defect image signals;
   wherein defects within the unacceptable individual objects of interest in the product stream are detected by applying a prior source of knowledge of unacceptable individual objects of interest characteristics and aspects relative to acceptable individual objects of interest characteristics and aspects to object images formed of the object presence image signals and the defect image signals;
   wherein the image model is updated with additional and subsequently acquired object presence image signals and defect image signals;
   wherein the position and location of the unacceptable individual objects of interest in the product stream are identified; and
   said plurality of control functions includes a third control function which renders operational an ejector, and wherein the third control function is coupled in signal receiving relation relative to an unacceptable individual objects of interest defect image signal which is generated by the second control function, and which further renders the ejector operational to remove unacceptable individual objects of interest from the product stream.

2. The apparatus of claim 1, further comprising:
   when the spatial orientation and location of the identified individual objects of interest travelling in the product stream is determined, a prior source of knowledge of object aspects is developed, formed of the object presence and defect signals, and the prior source of knowledge of object aspects is applied to the object images.

3. The apparatus of claim 1, further comprising:
   when defects within the unacceptable individual objects of interest in the product stream are detected, a prior source of knowledge of defect aspects is developed, wherein the prior source of knowledge of defect aspects is relative to object aspects in a multiplicity of object images formed of the object presence, and defect image signals.

4. The apparatus of claim 1, wherein the second control function:
   identifies individual objects of interest and defects in the object presence and defect image signals;

determines the spatial orientation of the identified objects of interest and defects travelling in the product stream;
identifies the defect in the defect image signal;
identifies the location of the defect in the defect image signal; and
generates an unacceptable individual objects of interest image signal.

5. The apparatus of claim 1, wherein the generation of the spatial resolution of each of the individual objects of interest in the product stream further includes aligning the discrete signal features of each of the multiplicity of synchronized image signals along a major axis of each of the individual objects of interest so that end portions of each of the individual objects of interest are identifiable;
wherein the step of identifying one or more of a group of pixels in each of the individual image signals further includes the step of identifying a location of the one or more group of pixels as occurring at one of the end portions of the individual objects of interest, or not at one of the end portions of the individual objects of interest; and
when the identified one or more of the group of pixels is identified as occurring at a designated position with respect to the major axis of the individual object of interest, the individual object of interest is identified as unacceptable and is removed from the product stream by the ejector; and
when the one or more of a group of pixels is identified as not occurring at a designated position along the major axis of the individual object of interest, the individual object of interest is identified as acceptable.

6. The apparatus of claim 1, wherein the unacceptable characteristics and aspects are physiological tuber disorders.

7. The apparatus of claim 1, wherein the unacceptable characteristics and aspects are concentrations of sugars.

8. The apparatus of claim 1, wherein the unacceptable characteristics and aspects are concentrations of reducing sugars.

9. The apparatus of claim 1, wherein the unacceptable characteristics and aspects are sugar ends.

10. The apparatus of claim 5, wherein the unacceptable characteristics and aspects are identified as sugar end defects and the identified sugar end defects occur at an end portion with respect to the major axis of the individual object of interest.

11. An apparatus for sorting comprising:
a plurality of individual objects of interest traveling in a product stream, wherein the individual objects of interest have characteristics and aspects which are deemed acceptable for further processing, and characteristics and aspects which are deemed a defect and which deemed defects include features that are invisible to traditional optical detection, and unacceptable for further processing; and
an inspection station comprising a plurality of image generating devices and sensors, the plurality of image generating devices and sensors are configured to generate a multiplicity of synchronized image and sensor signals, each having discreet signal features, and wherein the synchronized image and sensor signals represent the individual objects of interest traveling in the product stream;
wherein a multiplicity of fused sensor signals are generated by combining the multiplicity of synchronized image and sensor signals by a selective synchronization of the image generating devices and sensors, and by utilizing a known position, orientation, and an operational response of the respective image generating devices and sensors so as to allow the generation of a spatial resolution of each of the individual objects of interest travelling in the product stream, and to further align the signal features of each of the image and sensor signals;
wherein the presence of the individual objects of interest and possible defects is indicated in the fused sensor signals by applying an image model previously formed from a multiplicity of image signals which were acquired from the objects of interest, and the defects, to the multiplicity of fused sensor signals so as to facilitate the formation of a resulting object presence image signal, and a defect image signal;
wherein the individual objects of interest are identified with the object presence and defect image signals, by identifying one or more of a group of pixels in each of the object presence and defect image signals;
wherein a spatial orientation of the objects of interest travelling in the product stream is determined by applying a prior source of knowledge of the object aspects to a multiplicity of object images which are formed of the object presence and defect image signals;
wherein defects within unacceptable objects of interest are detected by applying a prior source of knowledge of defect aspects relative to object aspects, to the object images formed of the object presence and defect signals;
wherein the location of the unacceptable objects of interest having defects in the object image signals is identified; and
wherein the unacceptable objects of interest having defects are removed from the product stream.

12. The apparatus of claim 11, wherein the discreet signal features of the multiplicity of synchronized image signals are selected from the group of image signals provided by a hyperspectral or multispectral imager or laser scanner.

13. The apparatus of claim 11, wherein the synchronized image signals are formed by a methodology which includes a step of spatially registering the respective image signals.

14. The apparatus of claim 11, wherein the aspects and characteristics of the objects of interest which are deemed acceptable for further processing are selected from individual objects of interest having known acceptable qualities.

15. The apparatus of claim 11, wherein the aspects and characteristics of the objects of interest which are deemed unacceptable for further processing are selected from individual objects of interest having known unacceptable qualities.

16. The apparatus of claim 11, wherein the aligning of the signal features of each of the synchronized image signals so as to form, at least in part, the multiplicity of fused sensor signals comprises a partial registration of the image signals with each other, and with an ejector control function.

17. The apparatus of claim 11, wherein the image model is formed by a methodology which includes utilizing a standard classification algorithm.

18. The apparatus of claim 11, wherein the prior source of knowledge of the object aspects which is applied to the multiplicity of object images, and which is used to determine the spatial orientation of the identified objects of interest is formed by a methodology which comprises a step of conducting an object shape analysis; and conducting an object aspect measurement.

19. The apparatus of claim 11, wherein the prior source of knowledge of the defect aspects, and which is applied to the multiplicity of object images, is formed by the methodology which comprises a step of qualifying unacceptable pixel groups found in the object images, with object regions identified in the object aspects.

20. The apparatus of claim 11, wherein when removing the unacceptable objects of interest from the product stream further comprises removing an unacceptable portion of an object of interest from a remaining acceptable portion of the same object of interest.

21. The apparatus of claim 11, wherein a first control function indicates the presence of the objects of interest, and defects in the fused sensor signals, and which further applies the image model to the multiplicity of fused sensor signals.

22. The apparatus of claim 21, wherein a second control function which identifies individual objects of interest and defects travelling in the product stream determines the spatial orientation of the identified individual objects of interest travelling in the product stream; detects the objects of interest; identifies the location of the defects in the object presence and defect image signals; and generates a signal indicating the presence and location of the defect in the production stream.

23. The apparatus of claim 22, and further comprising:
a defect removal station positioned downstream of the inspection station; and
an ejector positioned in the defect removal station, and which is effective, when made operational, to remove the identified unacceptable objects of interest from the product stream;
wherein a third control function is controllably coupled with, and renders operational the ejector, and wherein the third control function is coupled in defect signal receiving relation relative to the second control function, and which further renders the ejector operational to remove the unacceptable objects of interest from the product stream.

24. The apparatus of claim 11, wherein the unacceptable characteristics and aspects are physiological tuber disorders.

25. The apparatus of claim 11, wherein the unacceptable characteristics and aspects are concentrations of sugars.

26. The apparatus of claim 11, wherein the unacceptable characteristics and aspects are sugar ends.

\* \* \* \* \*